US012672084B2

(12) United States Patent
Zhu

(10) Patent No.: US 12,672,084 B2
(45) Date of Patent: Jun. 30, 2026

(54) METHOD FOR REPORTING UPLINK TIMING ADVANCE, AND APPARATUS THEREFOR

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 356 days.

(21) Appl. No.: 18/282,135

(22) PCT Filed: Mar. 18, 2021

(86) PCT No.: PCT/CN2021/081617
§ 371 (c)(1),
(2) Date: Sep. 14, 2023

(87) PCT Pub. No.: WO2022/193248
PCT Pub. Date: Sep. 22, 2022

(65) Prior Publication Data
US 2024/0172154 A1    May 23, 2024

(51) Int. Cl.
*H04W 56/00* (2009.01)
*H04W 84/06* (2009.01)

(52) U.S. Cl.
CPC ..... *H04W 56/0045* (2013.01); *H04W 56/007* (2013.01); *H04W 56/009* (2013.01); *H04W 84/06* (2013.01)

(58) Field of Classification Search
CPC ........... H04W 56/0045; H04W 56/007; H04W 56/009; H04W 84/06; H04B 7/18513
See application file for complete search history.

(56) References Cited

U.S. PATENT DOCUMENTS

| | | | |
|---|---|---|---|
| 10,690,131 B2 * | 6/2020 | Rashid | F04B 49/065 |
| 11,737,042 B2 * | 8/2023 | Huang | H04W 24/10 |
| | | | 370/350 |

(Continued)

FOREIGN PATENT DOCUMENTS

| | | |
|---|---|---|
| CN | 112075107 A | 12/2020 |
| CN | 112075108 A | 12/2020 |
| WO | WO 2020031120 A2 | 2/2020 |

OTHER PUBLICATIONS

PCT/CN2021/081617, International Search Report dated Dec. 8, 2021, 2 pages.

(Continued)

*Primary Examiner* — Bailor C Hsu
(74) *Attorney, Agent, or Firm* — Cozen O'Connor

(57) ABSTRACT

A method for reporting an uplink timing advance is performed by a terminal device and includes: sending first indication information to a network device. The first indication information is used to indicate the uplink timing advance (TA) of the terminal device to the network device. A network device may perform a method for receiving first indication information sent by a terminal device. The first indication information may include at least one of an open-loop uplink TA corresponding to the terminal device; a first uplink TA corresponding to an entire round trip delay (RTD) compensated by the terminal device; or a second uplink TA corresponding to a specific RTD compensated by the terminal device.

20 Claims, 6 Drawing Sheets sending first indication information to a network device, wherein the first indication information is used to indicate the uplink timing advance (TA) of the terminal device to the network device

21

(56)  References Cited

U.S. PATENT DOCUMENTS

| | | | |
|---|---|---|---|
| 2016/0278033 A1* | 9/2016 | Wu .................... | H04W 56/0045 |
| 2019/0150125 A1* | 5/2019 | Bagheri ................ | H04L 69/324 |
| | | | 370/336 |
| 2019/0159149 A1* | 5/2019 | Ryu ................... | H04W 56/0045 |
| 2020/0252896 A1* | 8/2020 | Lei .................... | H04W 74/0836 |
| 2021/0212149 A1* | 7/2021 | Shih ...................... | H04W 76/19 |
| 2021/0289460 A1* | 9/2021 | Medles ............. | H04W 72/1268 |
| 2022/0124795 A1* | 4/2022 | Wu .................... | H04W 56/0045 |
| 2022/0224406 A1* | 7/2022 | Xu ......................... | H04W 72/02 |
| 2023/0099762 A1* | 3/2023 | Khoshkholgh Dashtaki .............. | |
| | | | H04W 56/001 |
| | | | 370/350 |
| 2023/0105278 A1* | 4/2023 | Kim .................... | H04W 56/005 |
| | | | 370/503 |

OTHER PUBLICATIONS

European Patent Application No. 21930840.0 Search Report dated May 2, 2024, 15 pages.

MediaTek Inc. et al., "Timing relationship enhancements for IoT-IoT NTN", 3GPP TSG RAN WG1 Meeting #104e, R1-2100602, Jan. 2021, 5 pages.

ZTE Corporation et al., "TP on Random Access for UE with location information", 3GPP TSG-RAN WG2 Meeting#107, R2-1911768, Aug. 2019, 16 pages.

* cited by examiner

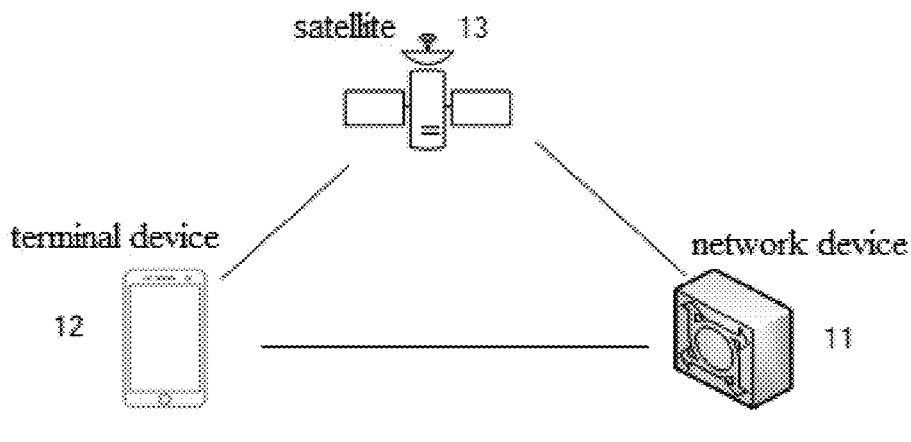

satellite 13 terminal device

12 network device

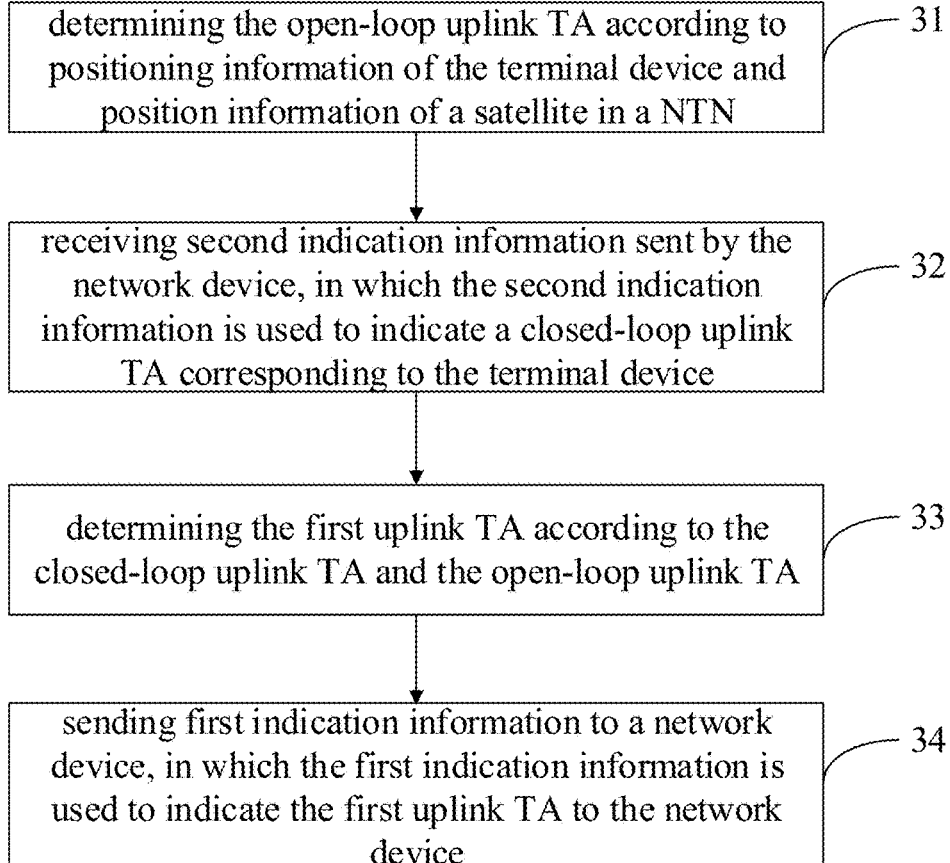

sending first indication information to a network device, wherein the first indication information is used to indicate the uplink timing advance (TA) of the terminal device to the network device — 21

FIG. 2 determining the open-loop uplink TA according to positioning information of the terminal device and position information of a satellite in a NTN — 31 receiving second indication information sent by the network device, in which the second indication information is used to indicate a closed-loop uplink TA corresponding to the terminal device — 32 determining the first uplink TA according to the closed-loop uplink TA and the open-loop uplink TA — 33 sending first indication information to a network device, in which the first indication information is used to indicate the first uplink TA to the network device — 34

FIG. 3

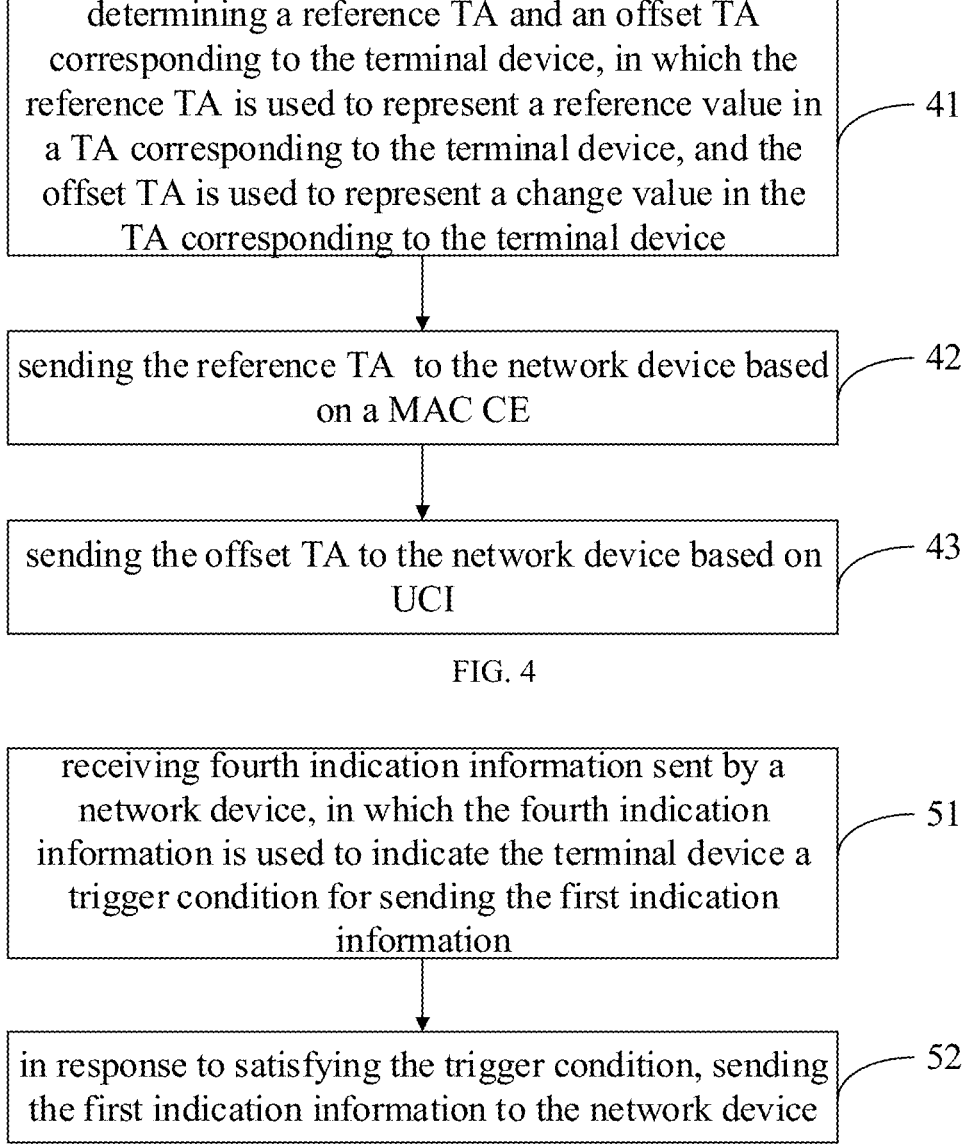

determining a reference TA and an offset TA corresponding to the terminal device, in which the reference TA is used to represent a reference value in a TA corresponding to the terminal device, and the offset TA is used to represent a change value in the TA corresponding to the terminal device — 41 sending the reference TA to the network device based on a MAC CE — 42 sending the offset TA to the network device based on UCI — 43

FIG. 4 receiving fourth indication information sent by a network device, in which the fourth indication information is used to indicate the terminal device a trigger condition for sending the first indication information — 51 in response to satisfying the trigger condition, sending the first indication information to the network device — 52

FIG. 5 receiving fourth indication information sent by a network device, in which the fourth indication information is used to indicate the terminal device a trigger condition for sending the first indication information — 61 receiving fifth indication information sent by the network device, in which the fifth indication information is used to indicate a timing value of a specified prohibition timer to the terminal device, and the specified prohibition timer is used to control a minimum time interval of continuously sending the first indication information by the terminal device to the network device — 62 in response to satisfying the trigger condition and the time interval between a current moment and a moment of an adjacent previously reported TA reaching a timing value of a first prohibition timer, sending the first indication information to the network device — 63

FIG. 6 receiving first indication information sent by a terminal device, in which the first indication information is used to indicate the uplink timing advance (TA) of the terminal device to the network device — 71

FIG. 7

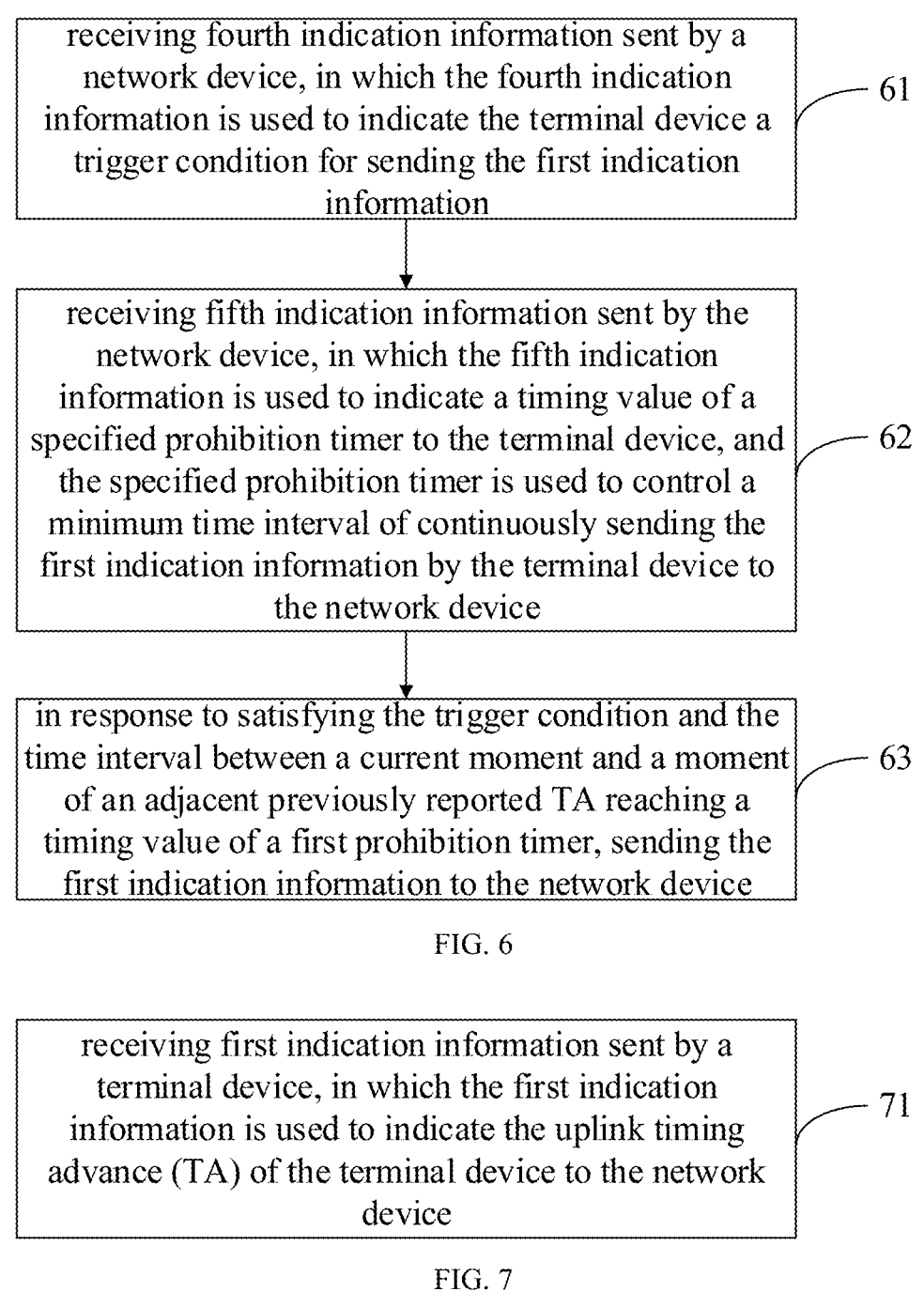

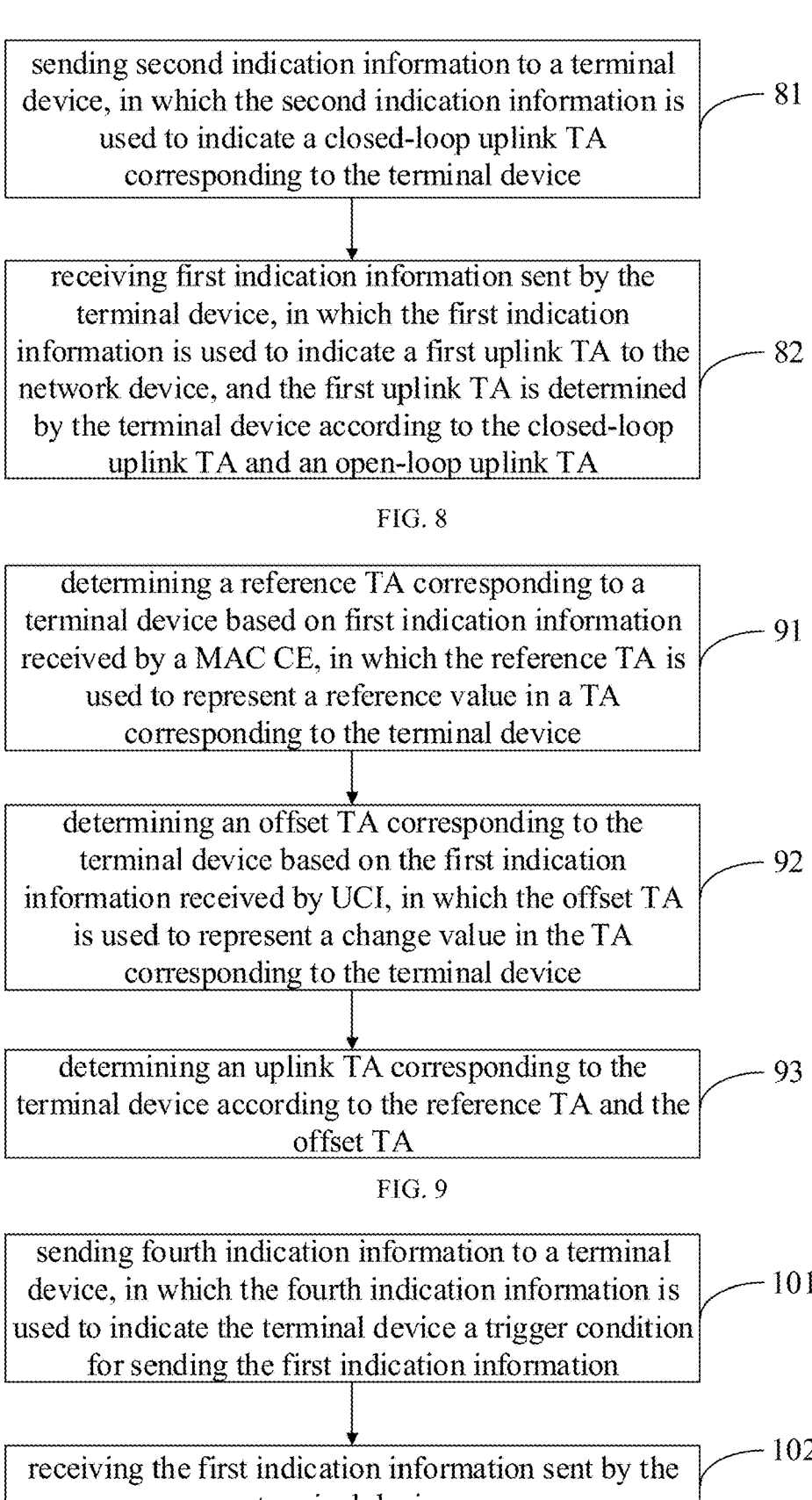

sending second indication information to a terminal
device, in which the second indication information is
used to indicate a closed-loop uplink TA
corresponding to the terminal device                              — 81 receiving first indication information sent by the
terminal device, in which the first indication
information is used to indicate a first uplink TA to the
network device, and the first uplink TA is determined
by the terminal device according to the closed-loop
uplink TA and an open-loop uplink TA                              — 82

FIG. 8 determining a reference TA corresponding to a
terminal device based on first indication information
received by a MAC CE, in which the reference TA is
used to represent a reference value in a TA
corresponding to the terminal device                             — 91 determining an offset TA corresponding to the
terminal device based on the first indication
information received by UCI, in which the offset TA
is used to represent a change value in the TA
corresponding to the terminal device                             — 92 determining an uplink TA corresponding to the
terminal device according to the reference TA and the
offset TA                                                        — 93

FIG. 9 sending fourth indication information to a terminal
device, in which the fourth indication information is
used to indicate the terminal device a trigger condition
for sending the first indication information            — 101 receiving the first indication information sent by the
terminal device                                         — 102

FIG. 10

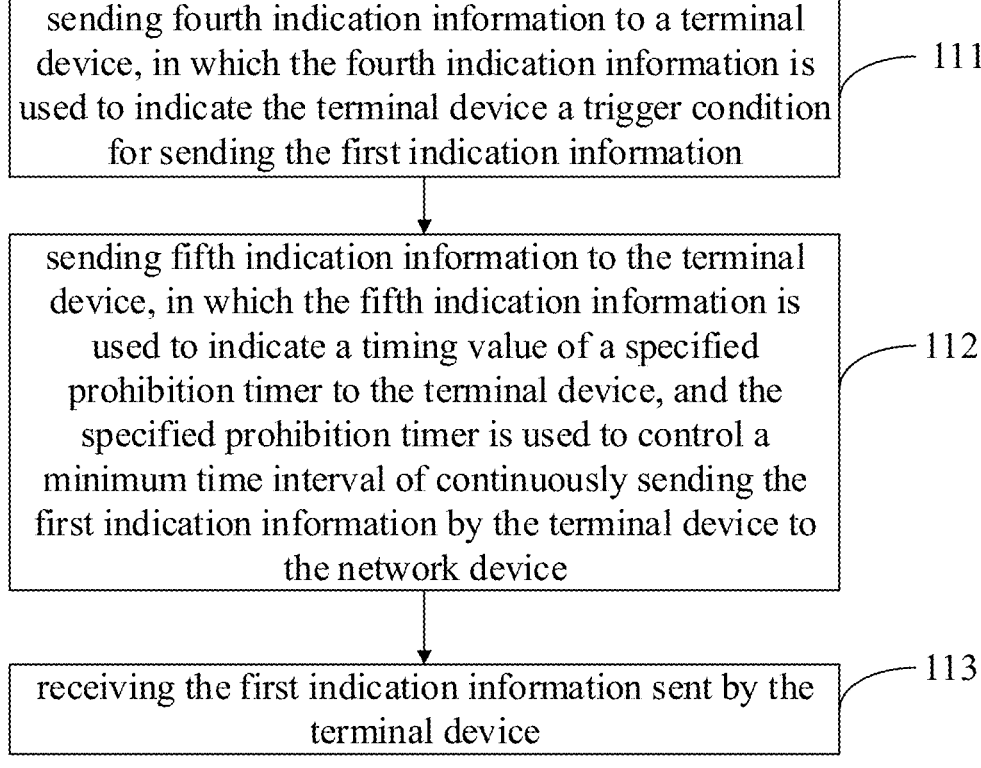

sending fourth indication information to a terminal device, in which the fourth indication information is used to indicate the terminal device a trigger condition for sending the first indication information ⟋— 111 sending fifth indication information to the terminal device, in which the fifth indication information is used to indicate a timing value of a specified prohibition timer to the terminal device, and the specified prohibition timer is used to control a minimum time interval of continuously sending the first indication information by the terminal device to the network device ⟋— 112 receiving the first indication information sent by the terminal device ⟋— 113

FIG. 11

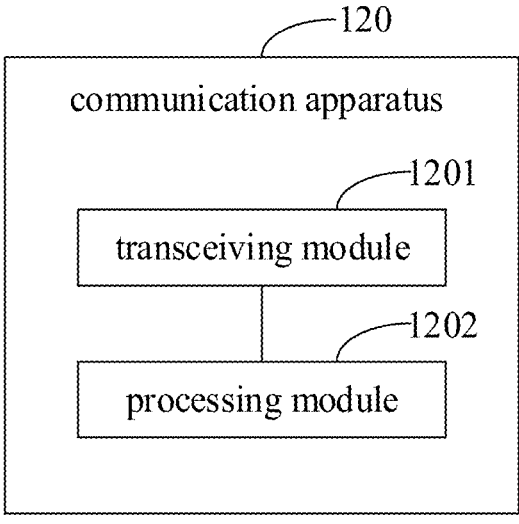

⟋—120 communication apparatus

⟋—1201
transceiving module

⟋—1202
processing module

FIG. 12

METHOD FOR REPORTING UPLINK TIMING ADVANCE, AND APPARATUS THEREFOR

CROSS-REFERENCE TO RELATED APPLICATION

This application is a U.S. national stage application of International Application No. PCT/CN2021/081617, filed Mar. 18, 2023, the entire contents of which are incorporated herein by reference.

TECHNICAL FIELD

The present disclosure relates to the field of communication technology, and more particularly to a method and apparatus for reporting an uplink timing advance.

BACKGROUND

In a wireless communication network, a propagation delay of a land mobile system is usually less than 1 millisecond (ms). In the related art, a network device usually uses a random access response (RAR) carried by a physical downlink shared channel (PDSCH) to send an initial timing advance (TA) to a terminal device, and then use a medium access layer (MAC) control element (CE) to send a TA adjustment command to the terminal device to compensate for a round trip delay (RTD), so that uplink data signals of different terminal devices arrive at the network device at the same time, so as to avoid interference among different terminals and different carriers.

However, in a non-terrestrial network (NTN), due to a large propagation distance of satellite communication and a high movement speed of a satellite, a propagation delay is very large and changes rapidly. At present, tracking and compensating for the rapid change in the propagation delay of the NTN has become a focus of development.

SUMMARY

In a first aspect, embodiments of the present disclosure provide a method for reporting an uplink timing advance, which is performed by a terminal device and includes: sending first indication information to a network device. The first indication information is used to indicate the uplink timing advance (TA) of the terminal device to the network device.

In a second aspect, embodiments of the present disclosure further provide a method for reporting an uplink timing advance, which is performed by a network device and includes: receiving first indication information sent by a terminal device. The first indication information is used to indicate the uplink timing advance (TA) of the terminal device to the network device.

In a third aspect, embodiments of the present disclosure provide a communication device, which includes a processor and a memory having stored therein a computer program. The processor executes the computer program stored in the memory, to cause the communication device to implement the method according to the first aspect above.

In a fourth aspect, embodiments of the present disclosure provide a communication device, which includes a processor and a memory having stored therein a computer program. The processor executes the computer program stored in the memory, to cause the communication device to implement the method according to the second aspect above.

In a fifth aspect, embodiments of the present disclosure provide a communication device, which includes a processor and an interface circuit. The interface circuit is configured to receive a code instruction and transmit the code instruction to the processor, and the processor is configured to run the code instruction to make the device implement the method according to the first aspect above.

In a sixth aspect, embodiments of the present disclosure provide a communication device, which includes a processor and an interface circuit. The interface circuit is configured to receive a code instruction and transmit the code instruction to the processor, and the processor is configured to run the code instruction to make the device implement the method according to the second aspect above.

In a seventh aspect, embodiments of the present disclosure provide a non-transitory computer-readable storage medium, for storing instructions used by the above-mentioned terminal device. The instructions, when executed, cause the terminal device to implement the method according to the first aspect above.

In an eighth aspect, embodiments of the present disclosure provide a non-transitory computer-readable storage medium, for storing instructions used by the above-mentioned network device. The instructions, when executed, cause the network device to implement the method according to the second aspect above.

BRIEF DESCRIPTION OF THE DRAWINGS

In order to more clearly illustrate the technical solutions in embodiments of the present disclosure or the background technology, drawings that need to be used in embodiments of the present disclosure or the background technology will be described below.

FIG. 1 is a schematic architecture diagram of a communication system provided by embodiments of the present disclosure;

FIG. 2 is a schematic flowchart of a method for reporting an uplink timing advance performed by a terminal device provided by embodiments of the present disclosure;

FIG. 3 is a schematic flowchart of a method for reporting an uplink timing advance performed by a terminal device provided by embodiments of the present disclosure;

FIG. 4 is a schematic flowchart of a method for reporting an uplink timing advance performed by a terminal device provided by embodiments of the present disclosure;

FIG. 5 is a schematic flowchart of a method for reporting an uplink timing advance performed by a terminal device provided by embodiments of the present disclosure;

FIG. 6 is a schematic flowchart of a method for reporting an uplink timing advance performed by a terminal device provided by embodiments of the present disclosure;

FIG. 7 is a schematic flowchart of a method for reporting an uplink timing advance performed by a network device provided by embodiments of the present disclosure;

FIG. 8 is a schematic flowchart of a method for reporting an uplink timing advance performed by a network device provided by embodiments of the present disclosure;

FIG. 9 is a schematic flowchart of a method for reporting an uplink timing advance performed by a network device provided by embodiments of the present disclosure;

FIG. 10 is a schematic flowchart of a method for reporting an uplink timing advance performed by a network device provided by embodiments of the present disclosure;

FIG. 11 is a schematic flowchart of a method for reporting an uplink timing advance performed by a network device provided by embodiments of the present disclosure;

FIG. 12 is a schematic block diagram of a communication apparatus provided by embodiments of the present disclosure;

DETAILED DESCRIPTION

Figures 13, 14:
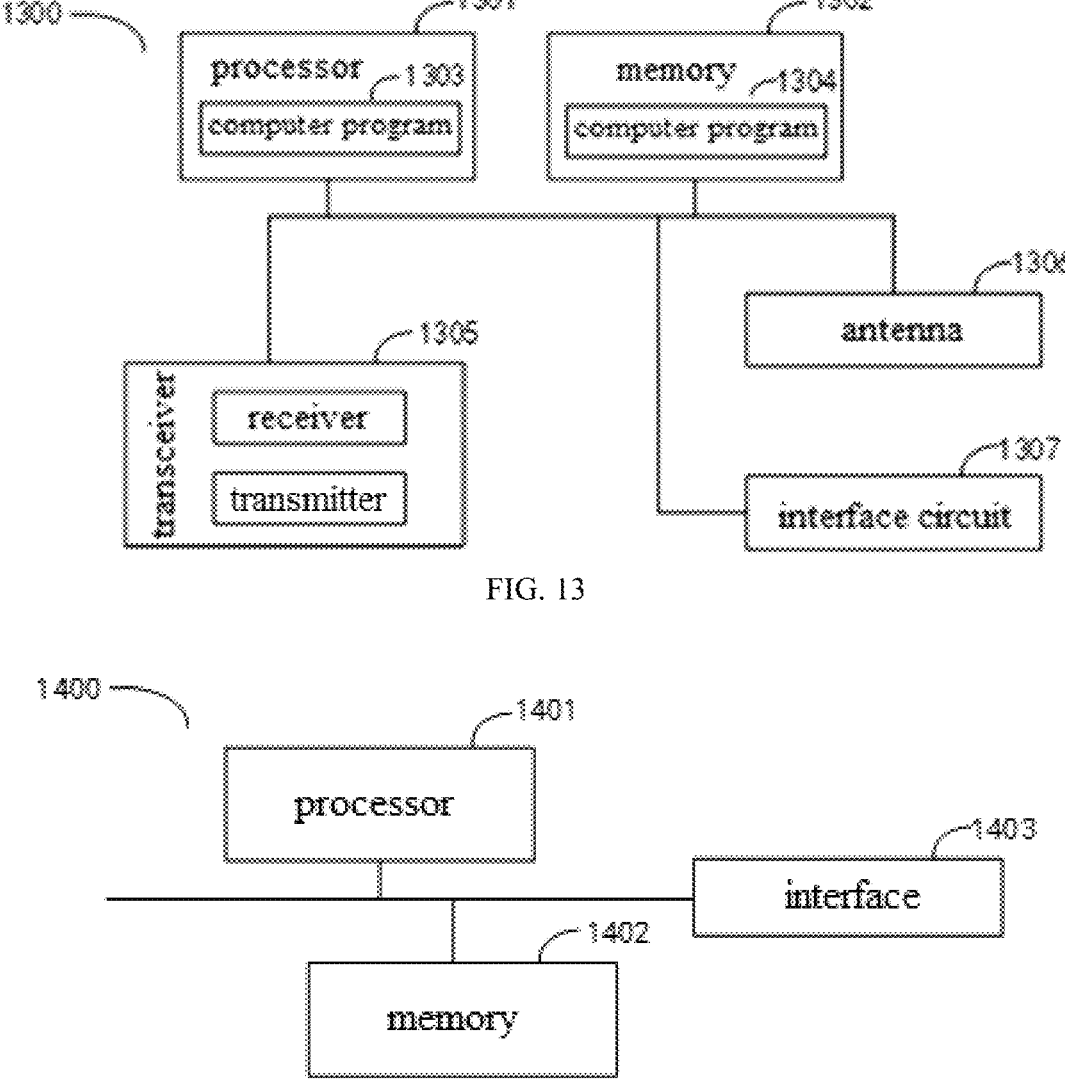
FIG. 13 is a schematic block diagram of another communication device provided by embodiments of the present disclosure.
FIG. 14 is a schematic block diagram of a chip provided by embodiments of the present disclosure.

For ease of understanding, terms involved in the present disclosure are introduced first.

1. Uplink Control Information (UCI)

The UCI is carried by a physical uplink control channel (PUCCH), and may include hybrid automatic repeat request (HARQ) feedback information, channel state information (CSI), etc. The PUCCH is a kind of physical channel configured to carry uplink scheduling information.

2. MAC CE

The MAC CE refers to a control element that communicates between a MAC layer of a terminal device and a MAC layer of a network device. It may be configured to carry a buffer status report (BSR), a TA and so on.

3. NTN Network

The NTN network refers to a network that is not deployed on the ground, including a satellite communication. The satellite communication refers to a communication performed by a radio communication device on the ground using a satellite as a relay node. A satellite communication system consists of a satellite part and a ground part.

NTN application scenarios in the 5G network include an enhanced mobile broad band (eMBB) scenario and a massive machine type communication (mMTC) scenario.

4. Vehicle-to-Everything (V2X) Communication

The V2X communication refers to a communication between a vehicle and any external object. The V2X communication may include, but is not limited to: vehicle to vehicle (V2V) communication, vehicle to pedestrian (V2P) communication, vehicle to infrastructure (V2I) communication, and vehicle to network (V2N) communication.

In order to better understand a method for reporting an uplink timing advance described in embodiments of the present disclosure, a communication system to which the embodiments of the present disclosure are applicable is firstly described below.

FIG. 1 is a schematic architecture diagram of a communication system provided by embodiments of the present disclosure. Referring to FIG. 1, the communication system may include, but is not limited to, a network device, a terminal device, and a satellite. The number and forms of the devices shown in FIG. 1 are only as an example and do not constitute a limitation on embodiments of the present disclosure. The communication system may include two or more network devices, two or more terminal devices in practical applications. As an example for illustration, the communication system shown in FIG. 1 includes a network device 11, a terminal device 12 and a satellite 13.

It should be noted that the technical solutions of embodiments of the present disclosure may be applied to various communication systems, for example, a long term evolution (LTE) system, a 5th generation (5G) mobile communication system, a 5G new radio (NR) system, or other future new mobile communication systems. The network device 11 in embodiments of the present disclosure is an entity on a network side for sending or receiving signals. For example, the network device 11 may be an evolved NodeB (eNB), a transmission reception point (TRP), a next generation NodeB (gNB) in a NR system, a base station in other future mobile communication systems, or an access node in a wireless fidelity (WiFi) system. Embodiments of the present disclosure do not limit the specific technology and specific device form adopted by the network device. The network device provided by embodiments of the present disclosure may be composed of a central unit (CU) and distributed units (DU). The CU may also be called a control unit. Using the CU-DU structure allows to split a protocol layer of the network device, such as the base station, a part of functions of the protocol layer is centrally controlled in the CU, some or all of the remaining functions of the protocol layer are distributed in the DUs, and the CU centrally controls the DUs. The satellite provided in embodiments of the present disclosure may be a low-orbit satellite or a high-orbit satellite, which is not limited in the present disclosure.

The terminal device 12 in embodiments of the present disclosure is an entity on a user side for receiving or sending signals, such as a mobile phone. The terminal device may also be called a terminal, a user equipment (UE), a mobile station (MS), a mobile terminal (MT), and so on. The terminal device may be a car with a communication function, a smart car, a mobile phone, a wearable device, a tablet Pad, a computer with a wireless transceiving function, a virtual reality (VR) terminal device, an augmented reality (AR) terminal device, a wireless terminal device in an industrial control, a wireless terminal device in a self-driving, a wireless terminal device in a remote medical surgery, a wireless terminal device in a smart grid, a wireless terminal device in a transportation safety, a wireless terminal device in a smart city, a wireless terminal device in a smart home, etc. Embodiments of the present disclosure do not limit the specific technology and the specific device form adopted by the terminal device.

Currently, uplink synchronization mechanisms of the 5G NR, a narrow band internet of things (NB-IoT), and an eMTC cannot track and compensate for a rapid change in the propagation delay of a NTN, so an open-loop uplink TA in the terminal device needs to be introduced. The open-loop uplink TA is a round trip delay of an electromagnetic wave that is obtained according to a propagation distance from a terminal device to a network calculated by the terminal device based on its own positioning information and position information of the satellite, and a propagation speed of the electromagnetic wave.

It can be understood that the communication system described in embodiments of the present disclosure is intended to illustrate the technical solutions of embodiments of the present disclosure more clearly, and does not constitute a limitation on the technical solutions provided by embodiments of the present disclosure. Those of ordinary skill in the art will know that with an evolution of a system architecture and an emergence of a new service scenario, the technical solutions provided by embodiments of the present disclosure are also applicable to similar technical problems.

Embodiments of the present disclosure provide a method and apparatus for reporting an uplink timing advance, which may be applied to virtual reality (VR), augmented reality (AR), and Internet of Vehicles, such as vehicle to everything (V2X) communication, long term evolution-vehicle (LTE-V), vehicle-to-vehicle (V2V) communication, etc., or may be used in intelligent driving, intelligent connected vehicles and other fields. Reporting an uplink TA by a terminal device enables a network device to accurately determine the uplink TA of the terminal device, so as to track a propagation delay of a NTN, perform a reliable and accurate RTD compensation for the terminal device, and determine an accurate scheduling timing sequence. Further, uplink data signals of different terminal devices can arrive the network device at the same time to avoid interferences among different terminal devices and different carriers, and signaling and services of the terminal can be scheduled accurately and timely.

In a first aspect, embodiments of the present disclosure provide a method for reporting an uplink timing advance, which is performed by a terminal device and includes: sending first indication information to a network device. The first indication information is used to indicate the uplink timing advance (TA) of the terminal device to the network device.

With the method for reporting the uplink timing advance provided by the present disclosure, the terminal device can directly send its corresponding uplink TA to the network device. In this way, the network device can accurately determine the uplink TA corresponding to the terminal device, so as to track the propagation delay of the NTN, perform the reliable and accurate RTD compensation for the terminal device, and schedule the signaling and service timing sequence for the terminal accurately.

In a second aspect, embodiments of the present disclosure further provide a method for reporting an uplink timing advance, which is performed by a network device and includes: receiving first indication information sent by a terminal device. The first indication information is used to indicate the uplink timing advance (TA) of the terminal device to the network device.

In a third aspect, embodiments of the present disclosure provide a communication apparatus, which has part or all of functions for implementing the terminal device in the method according to the first aspect above. For example, the communication apparatus may have functions as described in some or all the embodiments in the present disclosure, or may also have functions to separately implement any of embodiments in the present disclosure. The functions may be implemented by a hardware, or may be implemented by executing a corresponding software on the hardware. The hardware or the software includes one or more elements or modules corresponding to the above functions.

In an implementation manner, a structure of the communication apparatus may include a transceiving module and a processing module, and the processing module is configured to support the communication apparatus to perform corresponding functions in the above method. The transceiving module is configured to support a communication between the communication apparatus and other devices. The communication apparatus may further include a storage module, which is configured to be coupled with the transceiving module and the processing module, and store necessary computer programs and data of the communication apparatus.

As an example, the processing module may be a processor, the transceiving module may be a transceiver or a communication interface, and the storage module may be a memory.

In a fourth aspect, embodiments of the present disclosure provide another communication apparatus, which has part or all of functions for implementing the network device in method embodiments according to the second aspect above. For example, the communication apparatus may have functions as described in some or all the embodiments in the present disclosure, or may also have functions to separately implement any of embodiments in the present disclosure. The functions may be implemented by a hardware, or may be implemented by executing a corresponding software on the hardware. The hardware or the software includes one or more elements or modules corresponding to the above functions.

In an implementation manner, a structure of the communication apparatus may include a transceiving module and a processing module, and the processing module is configured to support the communication apparatus to perform corresponding functions in the above method. The transceiving module is configured to support a communication between the communication apparatus and other devices. The communication apparatus may further include a storage module, which is configured to be coupled with the transceiving module and the processing module, and store necessary computer programs and data of the communication apparatus.

In a fifth aspect, embodiments of the present disclosure provide a communication device, which includes a processor that, when invokes a computer program in a memory, executes the method according to the first aspect above.

In a sixth aspect, embodiments of the present disclosure provide a communication device, which includes a processor that, when invokes a computer program in a memory, executes the method according to the second aspect above.

In a seventh aspect, embodiments of the present disclosure provide a communication device, which includes a processor and a memory having stored therein a computer program. The processor executes the computer program stored in the memory, to cause the communication device to implement the method according to the first aspect above.

In an eighth aspect, embodiments of the present disclosure provide a communication device, which includes a processor and a memory having stored therein a computer program. The processor executes the computer program stored in the memory, to cause the communication device to implement the method according to the second aspect above.

In a ninth aspect, embodiments of the present disclosure provide a communication device, which includes a processor and an interface circuit. The interface circuit is configured to receive a code instruction and transmit the code instruction to the processor, and the processor is configured to run the code instruction to make the device implement the method according to the first aspect above.

In a tenth aspect, embodiments of the present disclosure provide a communication device, which includes a processor and an interface circuit. The interface circuit is configured to receive a code instruction and transmit the code instruction to the processor, and the processor is configured to run the code instruction to make the device implement the method according to the second aspect above.

In an eleventh aspect, embodiments of the present disclosure provide a system for reporting an uplink timing advance, which includes the communication apparatus according to the third aspect and the communication apparatus according to the fourth aspect, or includes the communication device according to the fifth aspect and the communication device according to the sixth aspect, or includes the communication device according to the seventh aspect and the communication device according to the eighth aspect, or includes the communication device according to the ninth aspect and the communication device according to the tenth aspect.

In a twelfth aspect, embodiments of the present disclosure provide a computer-readable storage medium, for storing instructions used by the above-mentioned terminal device. The instructions, when executed, cause the terminal device to implement the method according to the first aspect above.

In a thirteenth aspect, embodiments of the present disclosure provide a readable storage medium, for storing instructions used by the above-mentioned network device. The instructions, when executed, cause the network device to implement the method according to the second aspect above.

In a fourteenth aspect, the present disclosure further provides a computer program product, which includes a computer program that, when run on a computer, causes the computer to implement the method according to the first aspect above.

In a fifteenth aspect, the present disclosure further provides a computer program product, which includes a computer program that, when run on a computer, causes the computer to implement the method according to the second aspect above.

In a sixteenth aspect, the present disclosure provides a chip system, which includes at least one processor and an interface, for supporting a terminal device to implement functions involved in the first aspect, for example, determining or processing at least one of data and information involved in the above method. In a possible design, the chip system further includes a memory for storing necessary computer programs and data of the terminal device. The chip system may consist of chips, or may include chips and other discrete devices.

In a seventeenth aspect, the present disclosure provides a chip system, which includes at least one processor and an interface, for supporting a network device to implement functions involved in the second aspect, for example, determining or processing at least one of data and information involved in the above method. In a possible design, the chip system further includes a memory for storing necessary computer programs and data of the network device. The chip system may consist of chips, or may include chips and other discrete devices.

In an eighteenth aspect, the present disclosure provides a computer program that, when run on a computer, causes the computer to implement the method according to the first aspect above.

In a nineteenth aspect, the present disclosure provides a computer program that, when run on a computer, causes the computer to implement the method according to the second aspect above.

A method and apparatus for reporting an uplink timing advance provided by the present disclosure will be described in detail below with reference to the accompanying drawings.

Please refer to FIG. 2, FIG. 2 is a schematic flowchart of a method for reporting an uplink timing advance provided by embodiments of the present disclosure. The method is configured to be performed by a terminal device, as shown in FIG. 2, the method may include, but is not limited to, a following step.

In step 21, first indication information is sent to a network device. The first indication information is used to indicate the uplink timing advance (TA) of the terminal device to the network device.

In the present disclosure, in order to implement tracking and compensation for a propagation delay of a NTN, so as to compensate for an entire RTD of the terminal device, and perform an accurate timing sequence scheduling control for the terminal device, the terminal device may actively report its corresponding TA to the network device.

Optionally, the first indication information in the present disclosure may include at least one of: an open-loop uplink TA corresponding to the terminal device; a first uplink TA corresponding to an entire round trip delay (RTD) compensated by the terminal device; or a second uplink TA corresponding to a specific RTD compensated by the terminal device.

Optionally, the entire RTD is configured to represent a sum of a delay caused by a fast movement of a satellite and a round trip delay of data in a NTN system, and the corresponding first uplink TA may include the open-loop uplink TA and a closed-loop uplink TA.

Optionally, the closed-loop uplink TA may be an uplink TA determined by the network device according to arrival time of an uplink signal of the terminal device and sent to the terminal device.

Optionally, the closed-loop uplink TA may also include a common TA determined by the network device according to a cell where the terminal device is located or according to a beam corresponding to the terminal device. The common TA may be configured by the network device to the terminal device in a broadcast or multicast manner.

In addition, the specific RTD may be a RTD corresponding to the closed-loop uplink TA, or may be a RTD corresponding to the open-loop uplink TA, or may be a RTD corresponding to the open-loop uplink TA and the closed-loop uplink TA. The present disclosure does not limit this.

Optionally, in the present disclosure, the uplink TA in the first indication information may be an absolute value of a TA currently corresponding to the terminal device, or may also be a change value of a TA currently corresponding to the terminal device relative to a previously reported TA.

For example, if a currently reported uplink TA determined by the terminal device is 10 ms, the terminal may directly indicate the 10 ms in the first indication information. Alternatively, if a currently reported uplink TA determined by the terminal device is 10 ms, and an adjacent previously reported uplink TA of the terminal device is 8 ms, that is, the current uplink TA is delayed by 2 ms relative to the previously reported uplink TA, the terminal device may directly send a change value of −2 ms to the network device.

By implementing embodiments of the present disclosure, the terminal device can directly send its corresponding uplink TA to the network device. In this way, the network device can accurately determine the uplink TA corresponding to the terminal device, so as to track the propagation delay of the NTN, perform a reliable and accurate RTD compensation for the terminal device, and schedule signaling and a service timing sequence for the terminal accurately.

Please refer to FIG. 3, FIG. 3 is a schematic flowchart of another method for reporting an uplink timing advance provided by embodiments of the present disclosure. The method is configured to be performed by a terminal device, as shown in FIG. 3, the method may include, but is not limited to, the following steps.

In step 31, an open-loop uplink TA is determined according to positioning information of the terminal device and position information of a satellite in a NTN.

In step 32, second indication information sent by a network device is received. The second indication information is used to indicate a closed-loop uplink TA corresponding to the terminal device.

Optionally, the closed-loop uplink TA may be determined by the network device according to arrival time of an uplink signal of the terminal device. That is, the network device can calculate a RTD according to a moment of sending control information to the terminal device and the arrival time of a corresponding uplink signal sent by the terminal device, determine the closed-loop uplink TA according to the calculated RTD, and send the closed-loop uplink TA to the terminal device.

Optionally, the closed-loop uplink TA may also be determined by the network device according to a cell where the terminal device is located or according to a beam corresponding to the terminal device. Usually, partial closed-loop uplink TAs corresponding to different terminal devices located in a same cell or corresponding to a same beam may be the same, so the network device can, as required, uniformly send the same partial closed-loop uplink TA corresponding to the different terminal devices located in the same cell or corresponding to the same beam to the terminal devices in a broadcast or multicast manner.

Optionally, the closed-loop uplink TA may also be determined by the network device according to the arrival time of the uplink signal of the terminal device and the cell where the terminal device is located. Alternatively, the closed-loop uplink TA is determined by the network device according to the arrival time of the uplink signal of the terminal device and the beam corresponding to the terminal device. The present disclosure does not limit this.

In step 33, a first uplink TA is determined according to the closed-loop uplink TA and the open-loop uplink TA.

Optionally, in the present disclosure, the terminal device may determine the first uplink TA according to a sum of the closed-loop uplink TA and the open-loop uplink TA.

In step 34, first indication information is sent to the network device. The first indication information is used to indicate the first uplink TA to the network device.

Optionally, in the present disclosure, the terminal device may send the first uplink TA to the network device based on a MAC CE. For example, the terminal device may use a specified bit in the MAC CE to carry an absolute value or a relative value of the first uplink TA according to the configuration of the network device or according to a protocol. Meanings of the absolute value and the relative value of the first uplink TA can refer to the detailed description of any embodiment of the present disclosure, and will not be repeated here.

Optionally, in embodiments of the present disclosure, the terminal device may also send the first indication information to the network device based on UCI, or the terminal device may send the first indication information to the network device based on both the MAC CE and the UCI. The first uplink TA in the first indication information may be the absolute value of the first uplink TA, and may also be the relative value of the first uplink TA, which is not limited in the present disclosure.

By implementing embodiments of the present disclosure, after determining the open-loop uplink TA corresponding to the terminal device and receiving the closed-loop uplink TA sent by the network device, the terminal device can determine its corresponding first uplink TA, and send the first uplink TA to the network device. In this way, the network device can accurately determine the uplink TA of the terminal device, so as to track the propagation delay of the NTN, perform a reliable and accurate RTD compensation for the terminal device, and schedule signaling and a service timing sequence for the terminal accurately.

Please refer to FIG. 4, FIG. 4 is a schematic flowchart of another method for reporting an uplink timing advance provided by embodiments of the present disclosure. The method is configured to be performed by a terminal device, as shown in FIG. 4, the method may include, but is not limited to, the following steps.

In step 41, a reference TA and an offset TA corresponding to the terminal device are determined. The reference TA is used to represent a reference value in a TA corresponding to the terminal device, and the offset TA is used to represent a change value in the TA corresponding to the terminal device.

Usually, an uplink TA corresponding to the terminal device may include an open-loop uplink TA and a closed-loop uplink TA corresponding to the terminal device. The open-loop uplink TA may be determined by the terminal device according to its own position information and position information of a satellite in a NTN network. The closed-loop uplink TA is usually sent to the terminal device by a network device. The determining method of the closed-loop uplink TA may refer to the detailed description of any embodiment of the present disclosure, and will not be repeated here.

In embodiments of the present disclosure, in order to ensure the reliability and timeliness of a TA sent by the terminal device to the network device, the terminal device may divide its corresponding uplink TA into two parts: the reference TA and the offset TA.

The reference TA is a relatively fixed part of the TA corresponding to the terminal device, and the offset TA is used to represent a part with a relatively high change frequency in the TA corresponding to the terminal device.

For example, if the uplink TA corresponding to the terminal device is usually 20 ms to 28 ms, 20 ms may be the reference TA, and the rest may be the offset TA.

It should be noted that the terminal device may determine a division manner of the reference TA and the offset TA according to a protocol or according to the configuration of the network device. The present disclosure does not limit this.

In step 42, the reference TA is sent to the network device based on a MAC CE.

In step 43, the offset TA is sent to the network device based on UCI.

In embodiments of the present disclosure, considering that the reliability of the MAC layer is higher, but the transmission delay is relatively large, the reference TA is sent to the network device based on the MAC CE, and the offset TA is sent based on the UCI, thereby ensuring that the terminal device can accurately and reliably send its corresponding TA to the network device, and avoiding that the network device is unable to perform a RTD compensation for the terminal device due to a loss of the UCI.

By implementing embodiments of the present disclosure, after determining its corresponding reference TA and offset TA, the terminal device can send the reference TA to the network device based on the MAC CE, and send the offset TA to the network device based on the UCI. In this way, it is ensured that the terminal device can accurately and reliably send its corresponding TA to the network device to track a propagation delay of a NTN, and it is avoided that the network device is unable to perform a RTD compensation for the terminal device due to the loss of the UCI, thereby avoiding as much as possible that uplink data signals of different terminal devices arrive at the network device at different moments, and avoiding interferences among the different terminal devices and different carriers.

Please refer to FIG. 5, FIG. 5 is a schematic flowchart of another method for reporting an uplink timing advance provided by embodiments of the present disclosure. The method is configured to be performed by a terminal device, as shown in FIG. 5, the method may include, but is not limited to, the following steps.

In step 51, fourth indication information sent by a network device is received. The fourth indication information is used to indicate the terminal device a trigger condition for sending the first indication information.

In the present disclosure, the network device may also configure the trigger condition for reporting the uplink TA for the terminal device, so that the terminal device may orderly report its corresponding uplink TA according to the trigger condition.

The trigger condition may include any one of: a specified timing period; an offset of a currently to-be-reported TA relative to a reference TA reaching a first threshold value, where the reference TA is used to represent a reference value in the uplink TA corresponding to the terminal device; or an offset of a currently to-be-reported TA relative to an adjacent previously reported TA reaching a second threshold value.

In step 52, in response to satisfying the trigger condition, the first indication information is sent to the network device.

For example, the network device may configure the specified timing period for the terminal device to report the uplink TA. After that, the terminal device may configure a corresponding trigger timer according to the specified timing period, so that when the trigger timer reaches the specified time period, the first indication information is sent to the network device once. The terminal device immediately resets the trigger timer after sending the first indication information.

Alternatively, the trigger condition is the first threshold value, and the first threshold value is 2 ms, and the reference TA is 20 ms, then in the case where a current uplink TA of the terminal device is 25 ms, the terminal device determines that the offset of the currently to-be-reported TA relative to the reference TA is 5 ms, which is greater than the first threshold value of 2 ms, that is, the trigger condition is satisfied, so that the terminal device will send the first indication information to the network device.

Alternatively, the trigger condition is the second threshold value, and the second threshold value is 5 ms, then in the case where a current uplink TA is 30 ms, and the adjacent previously reported TA is 23 ms, the terminal device determines that the offset of the currently to-be-reported TA relative to the adjacent previously reported TA is 7 ms, which is greater than the second threshold value, that is, the trigger condition is satisfied, so that the terminal device will send the first indication information to the network device.

Optionally, in the present disclosure, the network device may also directly send third indication information to the terminal device, to indicate the terminal device to send the first indication information.

That is, only after receiving the third indication information sent by the network device, the terminal device sends the first indication information to the network device to indicate its corresponding uplink TA to the network device.

By implementing embodiments of the present disclosure, the terminal device first receives the fourth indication information containing the trigger condition sent by the network device, and sends its corresponding uplink TA to the network device in the case where the trigger condition is satisfied. In this way, it is ensured that the terminal device can accurately and orderly send its corresponding TA to the network device, thereby ensuring that the network device can track a propagation delay of a NTN, perform a RTD compensation for the terminal device, and schedule signaling and a service timing sequence for the terminal accurately.

Please refer to FIG. 6, FIG. 6 is a schematic flowchart of another method for reporting an uplink timing advance provided by embodiments of the present disclosure. The method is configured to be performed by a terminal device, as shown in FIG. 6, the method may include, but is not limited to, the following steps.

In step 61, fourth indication information sent by a network device is received. The fourth indication information is used to indicate the terminal device a trigger condition for sending the first indication information.

For a specific implementation form of the trigger condition, reference may be made to the detailed description of any embodiment of the present disclosure, which will not be repeated here.

In step 62, fifth indication information sent by the network device is received. The fifth indication information is used to indicate a timing value of a specified prohibition timer to the terminal device, and the specified prohibition timer is used to control a minimum time interval of continuously sending the first indication information by the terminal device to the network device.

In step 63, in response to satisfying the trigger condition and a time interval between a current moment and a moment of an adjacent previously reported TA reaching a timing value of a first prohibition timer, the first indication information is sent to the network device.

Usually, there may be a plurality of trigger conditions, and the plurality of trigger conditions may be triggered at the same time, or a time interval between twice triggers is very small, causing the terminal device to send the same indication information to the network device more than once, resulting in a waste of resources. In order to avoid the occurrence of these cases, in embodiments of the present disclosure, the terminal device may control the time interval of continuously sending the first indication information to the network device twice.

Specifically, the terminal device side may set the first prohibition timer to control the time interval for the terminal device to continuously report the uplink TA to the network device twice, and only when a time interval between a current moment and a moment of an adjacent previously sent uplink TA reaches a timing period of the first prohibition timer, the terminal device will send the uplink TA to the network device. In addition, the terminal device immediately resets the first prohibition timer after sending the first indication information.

The timing value of the first prohibition timer may be configured by the network device, or may be determined according to a protocol, which is not limited in the present disclosure.

Optionally, in the present disclosure, it is also possible that when the third indication information sent by the network device is received, and the time interval between the current moment and the moment of the adjacent previously reported TA is greater than a timing value of a second prohibition timer, the terminal device sends the first indication information to the network device.

Specifically, as the terminal device may also send the first indication information to the network device after receiving the third indication information sent by the network device, in the present disclosure, in order to avoid that the terminal device sends the same first indication information to the network device more than once, the second prohibition timer may be set in the terminal device to control the time interval for the terminal device to continuously report the uplink TA to the network device twice. After receiving the third indication information sent by the network device, the terminal device first judges whether the time interval between the current moment and the moment of the adjacent previously reported TA is greater than the timing value of the second prohibition timer, and sends the first indication information to the network device if the time interval between the current moment and the moment of the adjacent previously reported TA is greater than the timing value of the second prohibition timer, otherwise, the terminal device may not send the first indication information. In addition, the terminal device immediately resets the second prohibition timer after sending the first indication information.

The timing value of the second prohibition timer may be configured by the network device for the terminal device, or may be determined by the terminal device according to a protocol, which is not limited in the present disclosure.

In addition, the second prohibition timer may be the same as or may be different from the first prohibition timer, and the timing value of the second prohibition timer may be the same as or may be different from the timing value of the first prohibition timer. The present disclosure does not limit this.

By implementing embodiments of the present disclosure, the terminal device first receives the fourth indication information including the trigger condition and the timing value corresponding to the specified prohibition timer sent by the network device, and then sends its corresponding uplink TA to the network device in the case where the trigger condition is satisfied, and the time interval between the current moment and the moment of the adjacent previously sent uplink TA is greater than the timing value corresponding to the specified prohibition timer. In this way, it is ensured that the terminal device can accurately and orderly send its corresponding TA to the network device, and it is avoided that the terminal device sends the same indication information to the network device more than once to waste resources, thereby ensuring that the network device performs a RTD compensation for the terminal device, and schedules the signaling and the service timing sequence for the terminal accurately.

Please refer to FIG. 7, FIG. 7 is a schematic flowchart of another method for reporting an uplink timing advance provided by embodiments of the present disclosure. The method is configured to be performed by a network device, as shown in FIG. 7, the method may include, but is not limited to, a following step.

In step 71, first indication information sent by a terminal device is received. The first indication information is used to indicate the uplink timing advance (TA) of the terminal device to the network device.

In order to implement tracking and compensation for a propagation delay of a NTN, so as to compensate for an entire RTD of the terminal device, and perform an accurate timing sequence scheduling control for the terminal device, the terminal device may actively report its corresponding TA to the network device.

Optionally, the first indication information in the present disclosure may include at least one of: an open-loop uplink TA corresponding to the terminal device; a first uplink TA corresponding to an entire RTD compensated by the terminal device; or a second uplink TA corresponding to a specific RTD compensated by the terminal device.

Optionally, the entire RTD is configured to represent a total round trip delay between the terminal and a satellite in a NTN system, and the corresponding first uplink TA may include the open-loop uplink TA and a closed-loop uplink TA.

Optionally, the closed-loop uplink TA may be an uplink TA determined by the network device according to arrival time of an uplink signal of the terminal device and sent to the terminal device.

Optionally, the closed-loop uplink TA may also include a common TA determined by the network device according to a cell where the terminal device is located or according to a beam corresponding to the terminal device. The common TA may be configured by the network device to the terminal device in a broadcast or multicast manner.

In addition, the specific RTD may be a RTD corresponding to the closed-loop uplink TA, or may be a RTD corresponding to the open-loop uplink TA, or may be a RTD corresponding to the open-loop uplink TA and the closed-loop uplink TA. The present disclosure does not limit this.

Optionally, in the present disclosure, the uplink TA in the first indication information may be an absolute value of a TA currently corresponding to the terminal device, or may also be a change value of a TA currently corresponding to the terminal device relative to a previously reported TA.

For example, if a current uplink TA determined by the terminal device is 10 ms, the terminal may directly indicate the 10 ms in the first indication information. Alternatively, if a current uplink TA determined by the terminal device is 10 ms, and an adjacent previously reported uplink TA of the terminal device is 8 ms, that is, the current uplink TA is delayed by 2 ms relative to the previously reported uplink TA, the terminal device may directly send a change value of −2 ms to the network device.

By implementing embodiments of the present disclosure, the terminal device can directly send its corresponding uplink TA to the network device. In this way, the network device can track and compensate for a rapid change in the propagation delay of the NTN, perform a reliable and accurate RTD compensation for the terminal device, and schedule signaling and a service timing sequence for the terminal accurately.

Please refer to FIG. 8, FIG. 8 is a schematic flowchart of another method for reporting an uplink timing advance provided by embodiments of the present disclosure. The method is configured to be performed by a network device, as shown in FIG. 8, the method may include, but is not limited to, the following steps.

In step 81, second indication information is sent to a terminal device. The second indication information is used to indicate a closed-loop uplink TA corresponding to the terminal device.

Optionally, the closed-loop uplink TA may be determined by the network device according to arrival time of an uplink signal of the terminal device. That is, the network device can calculate a RTD according to a moment of sending control information to the terminal device and the arrival time of a corresponding uplink signal sent by the terminal device, determine the closed-loop uplink TA according to the calculated RTD, and send the closed-loop uplink TA to the terminal device.

Optionally, the closed-loop uplink TA may also be determined by the network device according to a cell where the terminal device is located or according to a beam corresponding to the terminal device. Usually, partial closed-loop uplink TAs corresponding to different terminal devices located in a same cell or corresponding to a same beam may be the same, so the network device can, as required, uniformly send the same partial closed-loop uplink TA corresponding to the different terminal devices located in the same cell or corresponding to the same beam to the terminal devices in a broadcast or multicast manner.

Optionally, the closed-loop uplink TA may also be determined by the network device according to the arrival time of the uplink signal of the terminal device and the cell where the terminal device is located. Alternatively, the closed-loop uplink TA is determined by the network device according to the arrival time of the uplink signal of the terminal device and the beam corresponding to the terminal device. The present disclosure does not limit this.

In step 82, first indication information sent by the terminal device is received. The first indication information is used to indicate a first uplink TA to the network device, and the first uplink TA is determined by the terminal device according to the closed-loop uplink TA and the open-loop uplink TA.

Optionally, in the present disclosure, the network device may receive the first uplink TA sent by the terminal device based on a MAC CE. For example, the network device may determine an absolute value or a relative value of the first uplink TA based on the content carried by a specified bit in the obtained MAC CE according to the configuration information sent to the terminal device or according to a protocol. Meanings of the absolute value and the relative value of the first uplink TA can refer to the detailed description of any embodiment of the present disclosure, and will not be repeated here.

Optionally, in embodiments of the present disclosure, the network device may also receive the first indication information sent by the terminal device based on UCI, or receive the first indication information sent by the terminal device based on both the MAC CE and the UCI. The first uplink TA in the first indication information may be an absolute value of the first uplink TA, and may also be a relative value of the first uplink TA, which is not limited in the present disclosure.

By implementing embodiments of the present disclosure, after determining the open-loop uplink TA corresponding to the terminal device and receiving the closed-loop uplink TA sent by the network device, the terminal device can determine its corresponding first uplink TA, and send the first uplink TA to the network device. In this way, the network device can accurately determine the uplink TA of the terminal device, so as to track the propagation delay of the NTN, perform a reliable and accurate RTD compensation for the terminal device, and schedule signaling and a service timing sequence for the terminal accurately.

Please refer to FIG. 9, FIG. 9 is a schematic flowchart of another method for reporting an uplink timing advance provided by embodiments of the present disclosure. The method is configured to be performed by a network device, as shown in FIG. 9, the method may include, but is not limited to, the following steps:

In step 91, a reference TA corresponding to a terminal device is determined based on first indication information received by a MAC CE. The reference TA is used to represent a reference value in a TA corresponding to the terminal device.

In step 92, an offset TA corresponding to the terminal device is determined based on the first indication information received by UCI. The offset TA is used to represent a change value in the TA corresponding to the terminal device.

In step 93, an uplink TA corresponding to the terminal device is determined according to the reference TA and the offset TA.

Usually, the uplink TA corresponding to the terminal device may include an open-loop uplink TA and a closed-loop uplink TA corresponding to the terminal device. The open-loop uplink TA may be determined by the terminal device according to its own position information and position information of a satellite in a NTN network. The closed-loop uplink TA is usually sent to the terminal device by the network device. The determining method of the closed-loop uplink TA may refer to the detailed description of any embodiment of the present disclosure, and will not be repeated here.

In embodiments of the present disclosure, in order to ensure the reliability and timeliness of a TA sent by the terminal device to the network device, the terminal device may divide its corresponding uplink TA into two parts: the reference TA and the offset TA.

The reference TA is a relatively fixed part of the TA corresponding to the terminal device, and the offset TA is used to represent a part with a relatively high change frequency in the TA corresponding to the terminal device.

For example, if the uplink TA corresponding to the terminal device is usually 20 ms to 28 ms, 20 ms may be the reference TA, and the rest may be the offset TA.

It should be noted that a manner in which the terminal device divides the reference TA and the offset TA may be determined according to a protocol or according to the configuration of the network device. The present disclosure does not limit this.

In embodiments of the present disclosure, considering that the reliability of the MAC layer is higher, but the transmission delay is relatively large, the reference TA may be transmitted based on the MAC CE, and the offset TA may be transmitted based on the UCI, thereby ensuring that the terminal device can accurately and reliably send its corresponding TA to the network device, and avoiding that the network device is unable to perform a RTD compensation for the terminal device due to a loss of the UCI.

By implementing embodiments of the present disclosure, the network device obtains the reference TA sent by the terminal device based on the MAC CE, receives the offset TA sent by the network device based on the UCI, and then determine the uplink TA corresponding to the terminal device according to the reference TA and the offset TA. In this way, it is ensured that the network device can accurately and reliably obtain the TA corresponding to the terminal device to track a propagation delay of a NTN, and it is avoided that the network device is unable to perform a RTD compensation for the terminal device due to a loss of the UCI, so that the network device can schedule signaling and a service timing sequence for the terminal accurately.

Please refer to FIG. 10, FIG. 10 is a schematic flowchart of another method for reporting an uplink timing advance provided by embodiments of the present disclosure. The method is configured to be performed by a network device, as shown in FIG. 10, the method may include, but is not limited to, the following steps.

In step 101, fourth indication information is sent to a terminal device. The fourth indication information is used to indicate the terminal device a trigger condition for sending the first indication information.

In the present disclosure, the network device may also configure the trigger condition for reporting the uplink TA for the terminal device, so that the terminal device may orderly report its corresponding uplink TA according to the trigger condition.

The trigger condition may include any one of: a specified timing period; an offset of a to-be-reported TA relative to a reference TA reaching a first threshold value, where the reference TA is used to represent a reference value in the TA corresponding to the terminal device; or an offset of a to-be-reported TA relative to an adjacent previously reported TA reaching a second threshold value.

In step 102, the first indication information sent by the terminal device is received.

For example, the network device may configure the specified timing period for the terminal device to report the uplink TA. After that, the terminal device may configure a corresponding trigger timer according to the specified timing period, so that when the trigger timer reaches the specified time period, the first indication information is sent to the network device once.

Alternatively, the trigger condition is the first threshold value, and the first threshold value is 2 ms, and the reference TA is 20 ms, then in the case where a current uplink TA of the terminal device is 25 ms, the terminal device determines that the offset of the currently to-be-reported TA relative to the reference TA is 5 ms, which is greater than the first threshold value of 2 ms, that is, the trigger condition is satisfied, so that the terminal device will send the first indication information to the network device.

Alternatively, the trigger condition is the second threshold value, and the second threshold value is 5 ms, then in the case where a current uplink TA is 30 ms, and the adjacent previously reported TA is 23 ms, the terminal device determines that the offset of the currently to-be-reported TA relative to the adjacent previously reported TA is 7 ms, which is greater than the second threshold value, that is, the trigger condition is satisfied, so that the terminal device will send the first indication information to the network device.

Optionally, in the present disclosure, the network device may also directly send third indication information to the terminal device, to indicate the terminal device to send the first indication information.

That is, only after receiving the third indication information sent by the network device, the terminal device sends the first indication information to the network device to indicate its corresponding uplink TA to the network device.

By implementing embodiments of the present disclosure, the network device first sends the fourth indication information containing the trigger condition to the terminal device, to indicate the terminal device to send its corresponding uplink TA to the network device in the case where the trigger condition is satisfied. In this way, it is ensured that the terminal device can accurately and orderly send its corresponding TA to the network device, thereby ensuring that the network device can track a propagation delay of a NTN, perform a RTD compensation for the terminal device, and schedule signaling and a service timing sequence for the terminal accurately.

Please refer to FIG. 11, FIG. 11 is a schematic flowchart of another method for reporting an uplink timing advance provided by embodiments of the present disclosure. The method is configured to be performed by a network device, as shown in FIG. 11, the method may include, but is not limited to, the following steps.

In step 111, fourth indication information is sent to a terminal device. The fourth indication information is used to indicate the terminal device a trigger condition for sending the first indication information.

For a specific implementation form of the trigger condition, reference may be made to the detailed description of any embodiment of the present disclosure, which will not be repeated here.

In step 112, fifth indication information is sent to the terminal device. The fifth indication information is used to indicate a timing value of a specified prohibition timer to the terminal device, and the specified prohibition timer is used to control a minimum time interval of continuously sending the first indication information by the terminal device to the network device.

In step 113, the first indication information sent by the terminal device is received.

Usually, there may be a plurality of trigger conditions, and the plurality of trigger conditions may be triggered at the same time, or a time interval between twice triggers is very small, causing the terminal device to send the same indication information to the network device more than once, resulting in a waste of resources. In order to avoid the occurrence of these cases, in embodiments of the present disclosure, the terminal device may control the time interval of continuously sending the first indication information to the network device twice.

Specifically, the terminal device side may set the first prohibition timer, i.e., a first prohibition timer configured to control the time interval for the terminal device to continuously report an uplink TA to the network device twice, and only when a time interval between a current moment and a moment of an adjacent previously sent uplink TA reaches a timing period of the first prohibition timer, the terminal device will send the uplink TA to the network device. In addition, the terminal device immediately resets the first prohibition timer after sending the first indication information.

The timing value of the first prohibition timer may be configured by the network device, or may be determined according to a protocol, which is not limited in the present disclosure.

Optionally, in the present disclosure, it is also possible that when the third indication information sent by the network device is received, and the time interval between the current moment and the moment of the adjacent previously reported TA is greater than a timing value of a second prohibition timer, the terminal device sends the first indication information to the network device.

Specifically, as the terminal device may also send the first indication information to the network device after receiving the third indication information sent by the network device, in the present disclosure, in order to avoid that the terminal device sends the same first indication information to the network device more than once, the second prohibition timer may be set in the terminal device, and the second prohibition timer is a prohibition timer configured to control the time interval for the terminal device to continuously report the uplink TA to the network device twice. After receiving the third indication information sent by the network device, the terminal device first judges whether the time interval between the current moment and the moment of the adjacent previously reported TA is greater than the timing value of the second prohibition timer, and sends the first indication information to the network device if the time interval between the current moment and the moment of the adjacent previously reported TA is greater than the timing value of the second prohibition timer, otherwise, the terminal device may not send the first indication information. In addition, the terminal device immediately resets the second prohibition timer after sending the first indication information.

The timing value of the second prohibition timer may be configured by the network device for the terminal device, or may be determined by the terminal device according to a protocol, which is not limited in the present disclosure.

In addition, the second prohibition timer may be the same as or may be different from the first prohibition timer, and the timing value of the second prohibition timer may be the same as or may be different from the timing value of the first prohibition timer. The present disclosure does not limit this.

By implementing embodiments of the present disclosure, the network device first sends the fourth indication information including the trigger condition and the timing value corresponding to the specified prohibition timer to the terminal device, so that in the case where the trigger condition is satisfied, and the time interval between the current moment and the moment of the adjacent previously sent uplink TA is greater than the timing value corresponding to the specified prohibition timer, the terminal device sends its corresponding uplink TA to the network device. In this way, it is ensured that the terminal device can accurately and orderly send its corresponding TA to the network device, and it is avoided that the terminal device sends the same indication information to the network device more than once to waste resources, thereby ensuring that the network device performs a RTD compensation for the terminal device, and schedules the signaling and the service timing sequence for the terminal accurately.

In the above embodiments provided by the present disclosure, the methods provided in embodiments of the present disclosure are introduced from perspectives of the terminal device and the network device respectively. In order to implement the various functions in the methods provided by the above embodiments of the present disclosure, the network device and the terminal device may include a hardware structure and a software module, and implement the above functions in a form of the hardware structure, the software module, or the hardware structure plus the software module. A certain function among the above mentioned functions may be implemented in the form of the hardware structure, the software module, or the hardware structure plus the software module.

Please refer to FIG. 12, FIG. 12 is a schematic block diagram of a communication apparatus 120 provided by embodiments of the present disclosure. The communication apparatus 120 shown in FIG. 12 may include a transceiving module 1201 and a processing module 1202. The transceiving module 1201 may include a sending module and/or a receiving module, the sending module is configured to implement a sending function, the receiving module is configured to implement a receiving function, and the transceiving module 1201 may implement the sending function and/or the receiving function.

The communication apparatus 120 may be a terminal device (such as the terminal device in the foregoing method embodiments), may also be an apparatus in the terminal device, and may also be an apparatus that can be matched and used with the terminal device. Or, the communication apparatus 120 may be a network device, may also be an apparatus in the network device, and may also be an apparatus that can be matched and used with the network device.

The communication apparatus 120 is the terminal device (such as the terminal device in the foregoing method embodiments):

The transceiving module 1201 is configured to send first indication information to a network device. The first indication information is used to indicate the uplink timing advance (TA) of the terminal device to the network device.

Optionally, the first indication information includes at least one of: an open-loop uplink TA corresponding to the terminal device; a first uplink TA corresponding to an entire round trip delay (RTD) compensated by the terminal device; or a second uplink TA corresponding to a specific RTD compensated by the terminal device.

Optionally, the uplink TA is an absolute value of an uplink TA currently corresponding to the terminal device, or a change value of an uplink TA currently corresponding to the terminal device relative to an adjacent previously reported uplink TA.

Optionally, the apparatus further includes a processing module configured to determine the open-loop uplink TA according to positioning information of the terminal device and position information of a satellite in the NTN.

Optionally, the transceiving module 1201 is further configured to receive second indication information sent by the network device. The second indication information is used to indicate a closed-loop uplink TA corresponding to the terminal device.

Optionally, the above apparatus further includes a processing module 1202, configured to determine the first uplink TA according to the closed-loop uplink TA and the open-loop uplink TA.

Optionally, the closed-loop uplink TA is determined by the network device according to arrival time of an uplink signal of the terminal device; and/or the closed-loop uplink TA is determined by the network device according to a cell where the terminal device is located or according to a beam corresponding to the terminal device.

Optionally, the transceiving module 1201 is specifically configured to send the first indication information to the network device based on a medium access layer (MAC) control element (CE); and/or send the first indication information to the network device based on uplink control information (UCI).

Optionally, the transceiving module 1201 is specifically configured to: determine a reference TA and an offset TA corresponding to the terminal device; send the reference TA to the network device based on the MAC CE; and send the offset TA to the network device based on the UCI. The reference TA is used to represent a reference value in a TA corresponding to the terminal device, and the offset TA is used to represent a change value in the TA corresponding to the terminal device.

Optionally, the transceiving module 1201 is specifically configured to: in response to satisfying a trigger condition, send the first indication information to the network device; or in response to satisfying a trigger condition and a time interval between a current moment and a moment of an adjacent previously reported TA reaching a timing value of a first prohibition timer, send the first indication information to the network device; or receive third indication information sent by the network device, and send the first indication information to the network device; or receive third indication information sent by the network device, and send the first indication information to the network device when a time interval between a current moment and a moment of an adjacent previously reported TA is greater than a timing value of a second prohibition timer. The third indication information is used to indicate the terminal device to send the first indication information.

Optionally, the trigger condition includes any one of: a specified timing period; an offset of a currently to-be-reported TA relative to the reference TA reaching a first threshold value; or an offset of a currently to-be-reported TA relative to the adjacent previously reported TA reaching a second threshold value. The reference TA is used to represent the reference value in the uplink TA corresponding to the terminal device.

Optionally, the transceiving module 1201 is further configured to receive fourth indication information sent by the network device. The fourth indication information is used to indicate the terminal device a trigger condition for sending the first indication information.

Optionally, the transceiving module 1201 is further configured to receive fifth indication information sent by the network device. The fifth indication information is used to indicate a timing value of a specified prohibition timer to the terminal device, and the specified prohibition timer is used to control a minimum time interval of continuously sending the first indication information by the terminal device to the network device.

In the communication apparatus provided by the present disclosure, the terminal device can directly send its corresponding uplink TA to the network device. In this way, the network device can accurately determine the uplink TA corresponding to the terminal device, so as to track the propagation delay of the NTN, perform a reliable and accurate RTD compensation for the terminal device, and schedule signaling and a service timing sequence for the terminal accurately.

The communication apparatus 120 is the network device:

The transceiving module 1201 is configured to receive first indication information sent by a terminal device. The first indication information is used to indicate an uplink timing advance (TA) of a terminal device to the network device.

Optionally, the first indication information includes at least one of: an open-loop uplink TA corresponding to the terminal device; a first uplink TA corresponding to an entire round trip delay (RTD) compensated by the terminal device; or a second uplink TA corresponding to a specific RTD compensated by the terminal device.

Optionally, the uplink TA is an absolute value of a TA currently corresponding to the terminal device, or a change value of a TA currently corresponding to the terminal device relative to a previously reported TA.

Optionally, the transceiving module 1201 is further configured to send second indication information to the terminal device. The second indication information is used to indicate a closed-loop uplink TA corresponding to the terminal device.

Optionally, the above apparatus 120 further includes a processing module 1202 configured to: determine the closed-loop uplink TA according to arrival time of an uplink signal of the terminal device; and/or determine the closed-loop uplink TA according to a cell where the terminal device is located or according to a beam corresponding to the terminal device.

Optionally, the transceiving module 1201 is specifically configured to: receive the first indication information sent by the terminal device based on a medium access layer (MAC) control element (CE); and/or receive the first indication information sent by the terminal device based on uplink control information (UCI).

Optionally, the processing module 1202 is configured to determine a reference TA corresponding to the terminal device based on the first indication information received by the MAC CE. The reference TA is used to represent a reference value in a TA corresponding to the terminal device.

Optionally, the processing module 1202 is further configured to determine an offset TA corresponding to the terminal device based on the first indication information received by the UCI. The offset TA is used to represent a change value in the TA corresponding to the terminal device.

The processing module 1202 is further configured to determine an uplink TA corresponding to the terminal device according to the reference TA and the offset TA.

Optionally, the transceiving module 1201 is further configured to send third indication information to the terminal device. The third indication information is used to indicate the terminal device to send the first indication information.

Optionally, the transceiving module 1201 is further configured to send fourth indication information to the terminal device. The fourth indication information is used to indicate the terminal device a trigger condition for sending the first indication information.

Optionally, the trigger condition includes any one of: a specified timing period; an offset of a to-be-reported TA relative to the reference TA reaching a first threshold value; or an offset of a to-be-reported TA relative to an adjacent previously reported TA reaching a second threshold value. The reference TA is used to represent the reference value in the uplink TA corresponding to the terminal device.

Optionally, the transceiving module 1201 is further configured to send fifth indication information to the terminal device. The fifth indication information is used to indicate a timing value of a specified prohibition timer to the terminal device, and the specified prohibition timer is used to control a minimum time interval of continuously sending the first indication information by the terminal device to the network device.

In the communication apparatus provided by the present disclosure, the network device first sends the fourth indication information containing the trigger condition to the terminal device, to indicate the terminal device to send its corresponding uplink TA to the network device in the case where the trigger condition is satisfied. In this way, it is ensured that the terminal device can accurately and orderly send its corresponding TA to the network device, thereby ensuring that the network device can track a propagation delay of a NTN, perform a RTD compensation for the terminal device, and schedule signaling and a service timing sequence for the terminal accurately.

Please refer to FIG. 13, FIG. 13 is a schematic block diagram of another communication device 130 provided by embodiments of the present disclosure. The communication device 130 may be a network device, may also be a terminal device (such as the terminal device in the foregoing method embodiments), may also be a chip, a chip system, or a processor that supports the network device to implement the above method, and may also be a chip, a chip system, or a processor that supports the terminal device to implement the above method. The device may be configured to implement the method as described in the above method embodiments, and for details, reference may be made to the descriptions in the above method embodiments.

The communication device 130 may include one or more processors 1301. The processor 1301 may be a general-purpose processor or a special-purpose processor. For example, it may be a baseband processor or a central processing unit. The baseband processor may be configured to process a communication protocol and communication data, and the central processing unit may be configured to control a communication device (such as a base station, a baseband chip, the terminal device, a terminal device chip, a DU or a CU, etc.) execute computer programs, and process data of computer programs.

Optionally, the communication device 130 may further include one or more memories 1302 having stored therein a computer program 1304. The processor 1301 executes the computer program 1304, to cause the communication device 130 to implement the method as described in the above method embodiments. Optionally, the memory 1302 may have stored therein data. The communication device 130 and the memory 1302 may be set separately or integrated together.

Optionally, the communication device 130 may further include a transceiver 1305 and an antenna 1306. The transceiver 1305 may be called a transceiving element, a transceiving machine, a transceiving circuit or the like, for implementing a transceiving function. The transceiver 1305 may include a receiver and a transmitter. The receiver may be called a receiving machine, a receiving circuit or the like, for implementing a receiving function. The transmitter may be called a sending machine, a sending circuit or the like for implementing a sending function.

Optionally, the communication device 130 may further include one or more interface circuits 1307. The interface circuit 1307 is configured to receive a code instruction and transmit the code instruction to the processor 1301. The processor 1301 runs the code instruction to enable the communication device 130 to execute the methods as described in the foregoing method embodiments.

The communication device 130 is the terminal device (such as the terminal device in the foregoing method embodiments): the processor 1301 is configured to execute the step 31 in FIG. 3, the step 33 in FIG. 3, or the step 41 in FIG. 4; and the transceiver 1305 is configured to execute the step 21 in FIG. 2, the step 32 in FIG. 3, the step 34 in FIG. 3, the step 42 in FIG. 4, the step 43 in FIG. 4, the step 51 in FIG. 5, the step 52 in FIG. 5, the step 61 in FIG. 6, the step 62 in FIG. 6, or the step 63 in FIG. 6.

The communication device 130 is the network device: the transceiver 1305 is configured to execute the step 71 in FIG. 7, the step 81 in FIG. 8, the step 82 in FIG. 8, the step 101 in FIG. 10, the step 102 in FIG. 10, the step 111 in FIG. 11, the step 112 in FIG. 11, or the step 113 in FIG. 11. The processor 1301 is configured to execute the step 91 in FIG. 9, the step 92 in FIG. 9, or the step 93 in FIG. 9.

In an implementation manner, the processor 1301 may include the transceiver configured to implement receiving and sending functions. For example, the transceiver may be a transceiving circuit, an interface, or an interface circuit. The transceiving circuit, the interface or the interface circuit configured to implement the receiving and sending functions may be separated or may be integrated together. The above transceiving circuit, interface or interface circuit may be configured to read and write codes/data, or the above transceiving circuit, interface or interface circuit may be configured to transmit or transfer signals.

In an implementation manner, the processor 1301 may has stored therein a computer program 1303 that, when run on the processor 1301, causes the communication device 130 to implement the method as described in the foregoing method embodiments. The computer program 1303 may be solidified in the processor 1301, and in this case, the processor 1301 may be implemented by a hardware.

In an implementation manner, the communication device 130 may include a circuit, and the circuit may implement the sending, receiving or communicating function in the foregoing method embodiments. The processor and the transceiver described in the present disclosure may be implemented on an integrated circuit (IC), an analog IC, a radio frequency integrated circuit (RFIC), a mixed-signal IC, an application specific integrated circuit (ASIC), a printed circuit board (PCB), an electronic device, etc. The processor and the transceiver may also be manufactured using various IC process technologies, such as a complementary metal oxide semiconductor (CMOS), a nMetal-oxide-semiconductor (NMOS), a positive channel metal oxide semiconductor (PMOS), a bipolar junction transistor (BJT), a bipolar CMOS (BiCMOS), silicon germanium (SiGe), gallium arsenide (GaAs), etc.

The communication device described in the above embodiments may be the network device or the terminal device (such as the terminal device in the foregoing method embodiments), but the scope of the communication device described in the present disclosure is not limited thereto, and a structure of the communication device is not limited by FIG. 13. The communication device may be a stand-alone device or may be a part of a larger device. For example, the communication device may be:

(1) a stand-alone integrated circuit (IC), or a chip, or a chip system or a subsystem;

(2) a set of one or more ICs, optionally, the set of ICs may also include a storage component for storing data and computer programs;

(3) an ASIC, such as a modem;

(4) a module that may be embedded in other devices;

(5) a receiver, a terminal device, an intelligent terminal device, a cellular phone, a wireless device, a handheld machine, a mobile unit, a vehicle device, a network device, a cloud device, an artificial intelligence device, etc.;

(6) others.

For the case where the communication device may be a chip or a chip system, reference may be made to a schematic structural diagram of the chip shown in FIG. 14. The chip shown in FIG. 14 includes a processor 1401 and an interface 1403. In the chip, one or more processors 1401 may be provided, and more than one interface 1403 may be provided.

For the case where the chip is used to implement functions of the terminal device in embodiments of the present disclosure:

the interface 1403 is configured to execute the step 21 in FIG. 2, the step 32 in FIG. 3, the step 34 in FIG. 3, the step 42 in FIG. 4, the step 43 in FIG. 4, the step 51 in FIG. 5, the step 52 in FIG. 5, the step 61 in FIG. 6, the step 62 in FIG. 6, or the step 63 in FIG. 6.

For the case where the chip is used to implement functions of the network device in embodiments of the present disclosure:

the interface 1403 is configured to execute the step 71 in FIG. 7, the step 81 in FIG. 8, the step 82 in FIG. 8, the step 101 in FIG. 10, the step 102 in FIG. 10, the step 111 in FIG. 11, the step 112 in FIG. 11, or the step 113 in FIG. 11.

Optionally, the chip further includes a memory 1402 for storing necessary computer programs and data.

Those skilled in the art may also understand that various illustrative logical blocks and steps listed in embodiments of the present disclosure may be implemented by an electronic hardware, a computer software, or a combination thereof. Whether such functions are implemented by a hardware or a software depends on specific applications and design requirements of an overall system. For each specific application, those skilled in the art may use various methods to implement the described functions, but such implementation should not be understood as beyond the protection scope of embodiments of the present disclosure.

Embodiments of the present disclosure also provide a system for reporting an uplink timing advance. The system includes the communication apparatus as the terminal device and the communication apparatus as the network device as described in the aforementioned embodiments in FIG. 12, or the system includes the communication device as the terminal device and the communication device as the network device as described in the aforementioned embodiments in FIG. 13.

The present disclosure also provides a readable storage medium having stored thereon instructions that, when executed by a computer, cause functions of any of the above method embodiments to be implemented.

The present disclosure also provides a computer program product that, when executed by a computer, causes functions of any of the above method embodiments to be implemented.

The above embodiments may be implemented in whole or in part by a software, a hardware, a firmware or any combination thereof. When implemented using the software, the above embodiments may be implemented in whole or in part in a form of the computer program product. The computer program product includes one or more computer programs. When the computer program is loaded and executed on the computer, all or part of the processes or functions according to embodiments of the present disclosure will be generated. The computer may be a general purpose computer, a special purpose computer, a computer network, or other programmable devices. The computer program may be stored in a computer-readable storage medium or transmitted from one computer-readable storage medium to another computer-readable storage medium. For example, the computer program may be transmitted from one website, computer, server or data center to another website site, computer, server or data center by a wired manner (such as via a coaxial cable, an optical fiber, a digital subscriber line (DSL)) or a wireless manner (such as infrared, wireless, or via microwave, etc.). The computer-readable storage medium may be any available medium that can be accessed by the computer, or a data storage device such as the server or the data center integrated with one or more available media. The available medium may be a magnetic medium (for example, a floppy disk, a hard disk, or a magnetic tape), an optical medium (for example, a high-density digital video disc (DVD)), or a semiconductor medium (for example, a solid state disk (SSD)) etc.

Those of ordinary skill in the art can understand that the first, second, and other numeral numbers involved in the present disclosure are only for convenience of description, and are not intended to limit the scope of embodiments of the present disclosure, and nor are they intended to represent sequential order.

The term "at least one" used in the present disclosure may also be described as one or more, and the term "a plurality of" may cover two, three, four or more, which are not limited in the present disclosure. In embodiments of the present disclosure, for a certain kind of technical feature, the technical features in this kind of technical feature are distinguished by term like "first", "second", "third", "A", "B", "C" and "D", etc., and these technical features described with the "first", "second", "third", "A", "B", "C" and "D" have no order of priority and have no order of size.

The correspondence shown in each table in the present disclosure may be configured or predefined. The values of information in each table are just examples, and may be configured as other values, which are not limited in the present disclosure. When configuring a correspondence between the information and various parameters, it is not necessary to configure all the correspondences shown in the tables. For example, the correspondences shown in some rows of the tables in the present disclosure may not be configured. For another example, appropriate deformations or adjustments (such as splitting, merging, and so on) can be made based on the above table. The names of parameters shown in the titles of the above tables may also adopt other names understandable by the communication device, and the values or representations of the parameters may also be other values or representations understandable by the communication device. When the above tables are implemented, other data structures may also be used, for example, arrays, queues, containers, stacks, linear tables, pointers, linked lists, trees, graphs, structural body, classes, heaps, or hash tables may be used.

The term "predefinition" in the present disclosure may be understood as definition, pre-definition, storage, pre-storage, pre-negotiation, pre-configuration, curing, or pre-firing.

Those of ordinary skill in the art can appreciate that the units and algorithm steps of various examples described in conjunction with embodiments disclosed herein may be implemented by the electronic hardware, or a combination of the computer software and the electronic hardware. Whether these functions are executed by the hardware or the software depends on the specific applications and design constraints of the technical solution. For each particular application, those skilled in the art may use different methods to implement the described functions, but such implementation should not be considered beyond the scope of the present disclosure.

Those skilled in the art can clearly understand that for the convenience and brevity of the description, the specific working process of the above-described system, device and unit may refer to the corresponding process in the foregoing method embodiments, which will not be repeated here.

The above only describes some specific implementations of the present disclosure, but the protection scope of the present disclosure is not limited thereto. Any changes or substitutions that are conceivable to those skilled in the art within the technical scope of the present disclosure should fall within the protection scope of the present disclosure. Therefore, the protection scope of the present disclosure should be determined by the protection scope of the claims.

What is claimed is:

1. A method for reporting an uplink timing advance, performed by a terminal device and comprising:
   sending first indication information to a network device based on a medium access layer (MAC) control element (CE) when a trigger condition is satisfied, wherein the first indication information is used to indicate the uplink timing advance (TA) of the terminal device to the network device;
   wherein the first indication information comprises a first uplink TA corresponding to an entire round trip delay (RTD) compensated by the terminal device;
   wherein the trigger condition comprises an offset of a currently to-be-reported TA relative to the adjacent previously reported TA reaching a second threshold value.

2. The method according to claim 1, wherein the first indication information comprises at least one of:
   an open-loop uplink TA corresponding to the terminal device; or
   a second uplink TA corresponding to a specific RTD compensated by the terminal device;
   wherein the uplink TA is an absolute value of an uplink TA currently corresponding to the terminal device, or a change value of an uplink TA currently corresponding to the terminal device relative to an adjacent previously reported uplink TA.

3. The method according to claim 2, further comprising:
   determining the open-loop uplink TA according to positioning information of the terminal device and position information of a satellite in a non-terrestrial network (NTN).

4. The method according to claim 2, further comprising:

receiving second indication information sent by the network device, wherein the second indication information is used to indicate a closed-loop uplink TA corresponding to the terminal device; and determining the first uplink TA according to the closed-loop uplink TA and the open-loop uplink TA;

wherein the closed-loop uplink TA is determined by the network device according to arrival time of an uplink signal of the terminal device; and/or the closed-loop uplink TA is determined by the network device according to a cell where the terminal device is located or according to a beam corresponding to the terminal device.

5. The method according to claim 1, wherein sending the first indication information to the network device comprises:

in response to satisfying the trigger condition and a time interval between a current moment and a moment of an adjacent previously reported TA reaching a timing value of a first prohibition timer, sending the first indication information to the network device; or receiving third indication information sent by the network device, and sending the first indication information to the network device, wherein the third indication information is used to indicate the terminal device to send the first indication information; or receiving third indication information sent by the network device, and sending the first indication information to the network device when a time interval between a current moment and a moment of an adjacent previously reported TA is greater than a timing value of a second prohibition timer.

6. The method according to claim 1, wherein the trigger condition comprises any one of:

a specified timing period; or an offset of a currently to-be-reported TA relative to a reference TA reaching a first threshold value, wherein the reference TA is used to represent a reference value in the uplink TA corresponding to the terminal device.

7. The method according to claim 5, further comprising:

receiving fourth indication information sent by the network device, wherein the fourth indication information is used to indicate the terminal device a trigger condition for sending the first indication information; and/or receiving fifth indication information sent by the network device, wherein the fifth indication information is used to indicate a timing value of a specified prohibition timer to the terminal device, and the specified prohibition timer is used to control a minimum time interval of continuously sending the first indication information by the terminal device to the network device.

8. A communication device, comprising a processor and an interface circuit;

wherein the interface circuit is configured to receive a code instruction and transmit the code instruction to the processor; and the processor is configured to run the code instruction to implement the method according to claim 1.

9. A non-transitory computer-readable storage medium having stored therein instructions that, when executed, cause the method according to claim 1.

10. The method according to claim 1, wherein sending the first indication information to the network device comprises:

determining a reference TA and an offset TA corresponding to the terminal device, wherein the reference TA is used to represent a reference value in a TA corresponding to the terminal device, and the offset TA is used to represent a change value in the TA corresponding to the terminal device;

sending the reference TA to the network device based on the MAC CE; and sending the offset TA to the network device based on uplink control information (UCI).

11. A method for reporting an uplink timing advance, performed by a network device and comprising:

receiving first indication information sent by a terminal device based on a medium access layer (MAC) control element (CE) when a trigger condition is satisfied, wherein the first indication information is used to indicate the uplink timing advance (TA) of the terminal device to the network device;

wherein the first indication information comprises a first uplink TA corresponding to an entire round trip delay (RTD) compensated by the terminal device;

wherein the trigger condition comprises an offset of a currently to-be-reported TA relative to the adjacent previously reported TA reaching a second threshold value.

12. The method according to claim 11, wherein the first indication information comprises at least one of:

an open-loop uplink TA corresponding to the terminal device; or a second uplink TA corresponding to a specific RTD compensated by the terminal device.

13. The method according to claim 11, further comprising:

sending second indication information to the terminal device, wherein the second indication information is used to indicate a closed-loop uplink TA corresponding to the terminal device; and/or determining the closed-loop uplink TA according to arrival time of an uplink signal of the terminal device; and/or determining the closed-loop uplink TA according to a cell where the terminal device is located or according to a beam corresponding to the terminal device; and/or sending third indication information to the terminal device, wherein the third indication information is used to indicate the terminal device to send the first indication information.

14. The method according to claim 13, further comprising:

sending fourth indication information to the terminal device, wherein the fourth indication information is used to indicate the terminal device the trigger condition for sending the first indication information and/or;

sending fifth indication information to the terminal device, wherein the fifth indication information is used to indicate a timing value of a specified prohibition timer to the terminal device, and the specified prohibition timer is used to control a minimum time interval of continuously sending the first indication information by the terminal device to the network device.

15. The method according to claim 11, wherein the trigger condition comprises any one of:

a specified timing period; or an offset of a to-be-reported TA relative to a reference TA reaching a first threshold value, wherein the reference TA is used to represent a reference value in an uplink TA corresponding to the terminal device.

16. A network device, comprising:

a processor; and a memory having stored therein a computer program, wherein the processor executes the computer program stored in the memory, to cause the device to implement the method according to claim 11.

17. A network device, comprising a processor and an interface circuit;

wherein the interface circuit is configured to receive a code instruction and transmit the code instruction to the processor; and the processor is configured to run the code instruction to implement the method according to claim 11.

18. A non-transitory computer-readable storage medium having stored therein instructions that, when executed, cause the method according to claim 11.

19. The method according to claim 11, further comprising:

determining a reference TA corresponding to the terminal device based on the first indication information received by the MAC CE, wherein the reference TA is used to represent a reference value in a TA corresponding to the terminal device;

determining an offset TA corresponding to the terminal device based on the first indication information received by uplink control information (UCI), wherein the offset TA is used to represent a change value in the TA corresponding to the terminal device; and determining an uplink TA corresponding to the terminal device according to the reference TA and the offset TA.

20. A communication device, comprising:

a processor; and a memory having stored therein a computer program, wherein the processor executes the computer program stored in the memory, to cause the device to send first indication information to a network device based on a medium access layer (MAC) control element (CE) when a trigger condition is satisfied, wherein the first indication information is used to indicate an uplink timing advance (TA) of a terminal device to the network device;

wherein the first indication information comprises a first uplink TA corresponding to an entire round trip delay (RTD) compensated by the terminal device;

wherein the trigger condition comprises an offset of a currently to-be-reported TA relative to the adjacent previously reported TA reaching a second threshold value.

* * * * *